United States Patent [19]

Loeffler

[11] E Re. 29,707

[45] Reissued Jul. 25, 1978

[54] PRODUCT PRESSURIZED AIR DISPENSER HAVING IMPROVED PRODUCT CONTROL VALVE ACTUATOR

[76] Inventor: Herbert H. Loeffler, 53 Spy Pond La., Arlington, Mass. 02174

[21] Appl. No.: 798,498

[22] Filed: May 19, 1977

Related U.S. Patent Documents

Reissue of:

[64] Patent No.: 3,979,027
Issued: Sep. 7, 1976
Appl. No.: 615,087
Filed: Sep. 19, 1975

U.S. Applications:

[63] Continuation-in-part of Ser. No. 520,946, Nov. 4, 1974, Pat. No. 3,910,465.

[51] Int. Cl.[2] ..... B67D 5/54
[52] U.S. Cl. ..... 222/193
[58] Field of Search ..... 222/193, 389, 383, 378; 239/357, 322, 349

[56] References Cited

U.S. PATENT DOCUMENTS

| | | | |
|---|---|---|---|
| 3,583,491 | 6/1971 | Lindeberg | 239/322 |
| 3,756,474 | 9/1973 | Riccio | 222/383 |
| 3,764,046 | 10/1973 | Riccio | 222/193 |
| 3,788,525 | 1/1974 | Thornton | 222/193 |
| 3,788,556 | 1/1974 | Riccio | 222/193 |
| 3,860,150 | 1/1975 | Maier | 222/193 |
| 3,861,564 | 1/1975 | Loeftler | 222/193 X |

*Primary Examiner*—Allen N. Knowles

[57] ABSTRACT

An improved fluent product dispenser in which the product is dispensed by means of compressed air has a dispenser body having a dispensing means therein for mixing and dispersing the fluent product and compressed air and has a piston-cylinder means thereon by which the air is compressed, and when it reaches a certain predetermined pressure, is suddenly released. The fixed member of the piston-cylinder means has a fluent product containing recess opening toward the movable member of the piston-cylinder means, and a product pressurizing piston in the product containing recess has an end exposed toward the movable member or the piston-cylinder means. A product control valve means controls the flow of product from the product containing recess to the dispensing nozzle through the body. Likewise, a compressed air valve opens to permit flow of compressed air through a compressed air path in the body to the nozzle when the compressed air reaches a certain predetermined pressure. A product valve actuator is coupled to the product valve and is mounted in a flexible diaphragm sealed at the edge thereof, and the compressed air flow path opens into the space beneath the diaphragm so as to open the product valve in a predetermined time relationship to the opening of the compressed air valve means, so that when the movable member of the piston-cylinder means is moved toward the fixed member for compressed air, the compressed air acts on the product pressurizing piston for pressurizing the product, and when the compressed air is released from the piston-cylinder means, it acts on the product valve actuator to actuate the product valve and release the product only upon release of compressed air.

5 Claims, 4 Drawing Figures

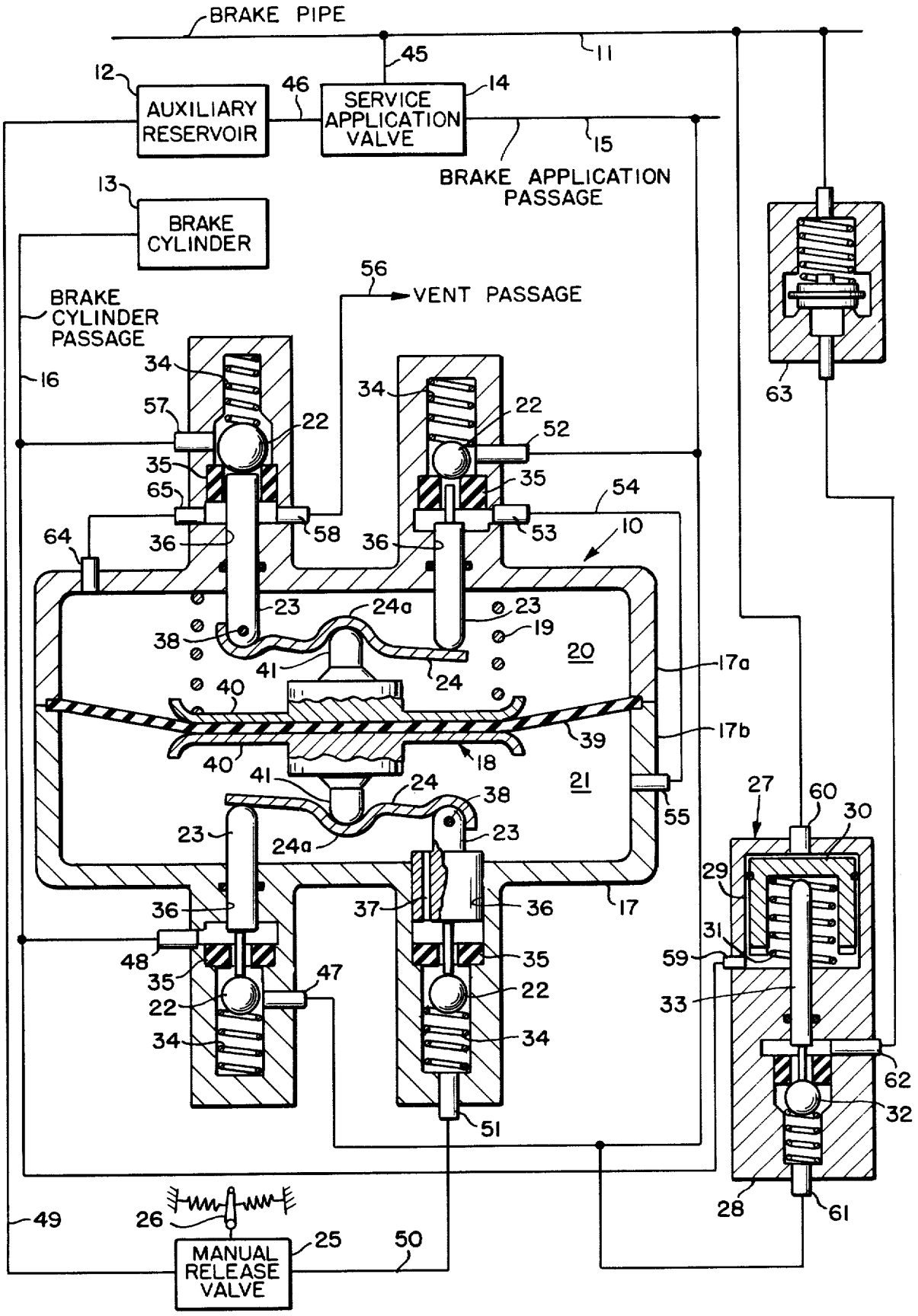
BRAKE PIPE
11
45
12
AUXILIARY RESERVOIR
46
SERVICE APPLICATION VALVE
14
15
BRAKE APPLICATION PASSAGE
13
BRAKE CYLINDER
56
VENT PASSAGE
BRAKE CYLINDER PASSAGE
16
34
57
22
35
65
58
36
64
23
24a
38
41
24
40
39
18
20
21
17a
17b
17
10
54
52
53
55
63
27
60
30
29
31
59
33
62
32
28
61
37
48
47
51
49
26
MANUAL RELEASE VALVE
25
50

PRODUCT PRESSURIZED AIR DISPENSER HAVING IMPROVED PRODUCT CONTROL VALVE ACTUATOR

Matter enclosed in heavy brackets [ ] appears in the original patent but forms no part of this reissue specification; matter printed in italics indicates the additions made by reissue.

This application is a continuation-in-part of copending application Ser. No. 520,946 filed Nov. 4, 1974, now U.S. Pat. No. 3,910,465.

This invention relates to a dispenser for dispensing a fine spray of a fluent product by means of compressed air, and more particularly relates to an improved product control valve actuator for such a dispenser in which the product to be dispensed is pressurized and mixed with the compressed air in the nozzle to create a fine spray with a good pattern of droplets and a relatively large proportion of the spray being droplets of extremely fine size.

BACKGROUND AND PRIOR ART

Recent developments in the aerosol dispenser art have been along the lines of providing a dispenser in which the fluent product is dispensed by means of compressed air, rather than by one of the conventional propellants, such as Freon or the like. The toxic properties of Freon have been a subject of concern, and the development of compressed air type dispensers avoids the use of Freon, thus avoiding the problems associated therewith.

Recently developed dispensers which use a charge of compressed air to aspirate a product from a separate product container each time the dispenser is actuated are found in U.S. Pat. Nos. 3,672,545 and 3,733,010. However, these dispensers do not produce a spray with droplets of a size thought to be desirable for a medicament containing inhalent. Thus, in U.S. Pat. Application Ser. No. 411,267, now abandoned, filed Oct. 31, 1973 in the name of Roger B. Caron et al., there is disclosed a dispenser in which fine droplets on the order of one to ten microns can be generated in such a compressed air type dispenser by exerting a pressure on the product. Droplets of this size are thought to be most effective for an inhalent.

However, the apparatus of this lastmentioned application for generating the charge of compressed air and exerting a pressure on the product at the time of the release of the compressed air so as to dispense the product is somewhat complicated. Thus far, it has been the practice to exert this pressure on the product by means of mechanical actuation of a piston in contact with the product by a mechanical connection between the compressed air compressing means and the piston, or to exert a pressure on the product by means of the force exerted by the hand of the user of the dispenser directly on the product through the container for the product.

The type of dispenser in which pressure is exerted on the fluent product by means of a product pressurizing piston mechanically actuated by the compressed air means is somewhat complex in structure, requiring a number of parts and rather complicated shapes of parts, which are difficult to mold, such as in a material like plastic. The type of dispenser in which the pressure is exerted on the product by the force exerted by the hand of the user can be made in a somewhat less complicated manner, but again a number of parts are necessary, and the pressure is not always properly coordinated with the pressure exerted on the means for compressing the air.

Further, the structure of these devices does not lend itself readily to easily controlling the relative pressure of the compressed air charge relative to the pressurized product.

It is desirable to have such a device which has a simple construction, i.e. relatively few parts, and a structure which makes it possible to shape the parts in relatively simple shapes so that they are easily molded on conventional molding apparatus. It is further desirable to have such a structure in which the relative pressures of the compressed air and the pressurized product at the nozzle where they are mixed can be easily controlled by varying the structural features of the device. Technical progress in the art of such aerosol dispensers would be achieved if such a device could be provided.

OBJECTS AND SUMMARY OF THE INVENTION

It is accordingly an object of the present invention to provide a dispensing device for dispensing fluent material by means of a charge of compressed air, in which the fluent material is also pressurized and the pressurized product and compressed air are mixed at a dispensing nozzle, and which structure has relatively few parts, which parts, particulaly a product control valve actuator, are easily molded in plastic on conventional apparatus, and which parts are easily assembled into the final device.

More particularly, it is the object of the present invention to provide such a dispenser in which the product control valve actuator is not only readily responsive to the pressure of the compressed air, but also is easily sealed to the dispenser structure to prevent escape of compressed air.

These objects are achieved by a dispenser in which a dispenser body having a dispensing means therein for mixing and dispersing the fluent product and compressed air has a piston-cylinder means thereon by which the air is compressed, and when it reaches a certain predetermined pressure, is suddenly released. The fixed member of the piston-cylinder means has a fluent product containing recess opening toward the movable member of the piston-cylinder means, and a product pressurizing piston in the product containing recess has an end exposed toward the movable member or the piston-cylinder means. A product control valve means controls the flow of product from the product containing recess to the dispensing nozzle through the body. Likewise, a compressed air valve opens to permit flow of compressed air through a compressed air path in the body to the nozzle when the compressed air reaches a certain predetermined pressure. A product valve actuator is coupled to the product valve and is mounted in a flexible diaphragm sealed at the end thereof to the body. The compressed air path opens into the space beneath the diaphragm so as to open the product valve in a predetermined timed relationship to the opening of the compressed air valve means in response to the pressure of the compressed air flowing in the path when it is released from the piston-cylinder means, so that when the movable member of the piston-cylinder means is moved toward the fixed member for compressing air, the compressed air acts on the product pressurizing piston for pressurizing the product as well as to actuate the product valve and release the product only upon release of compressed air.

BRIEF DESCRIPTION OF THE DRAWINGS

The invention will be described in greater detail hereinafter in connection with the accompanying drawings, in which.

DETAILED DESCRIPTION OF THE INVENTION

Figure 1:
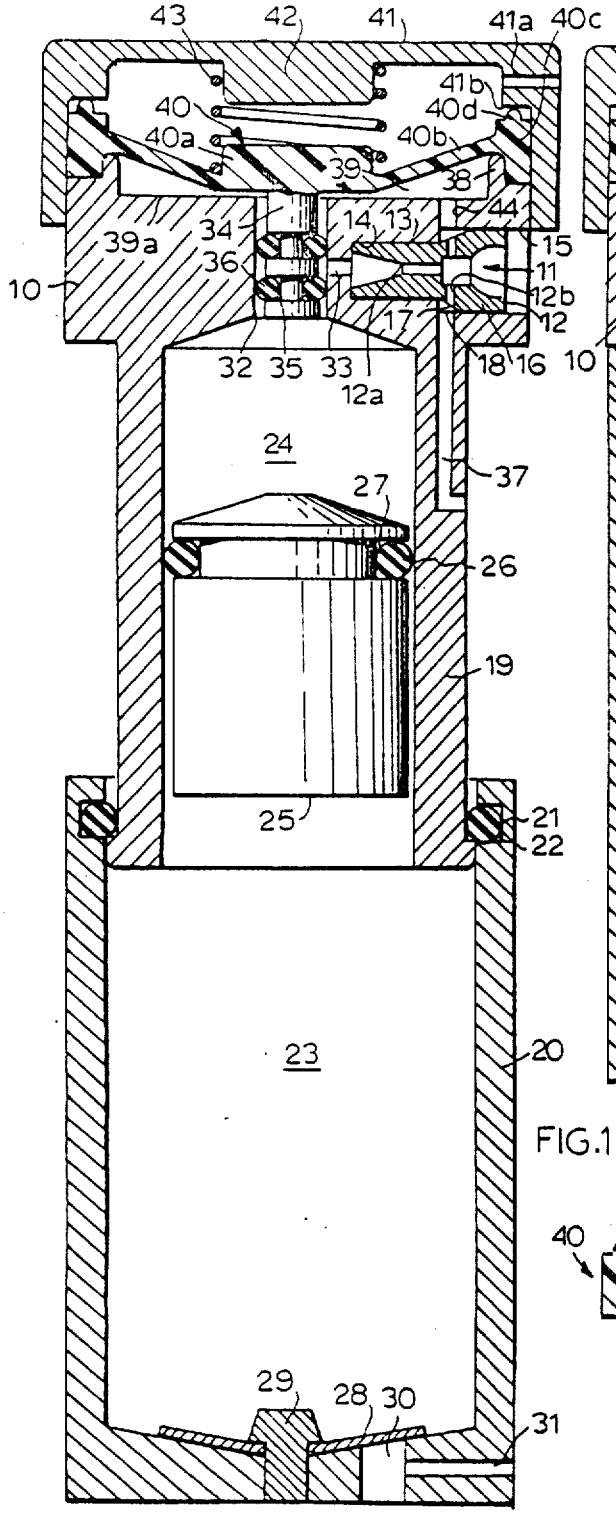
FIG. 1 is a sectional elevation of a first embodiment of the dispensing device according to the present invention, with the parts in positions at the start of a dispensing operation.
Figure 2:
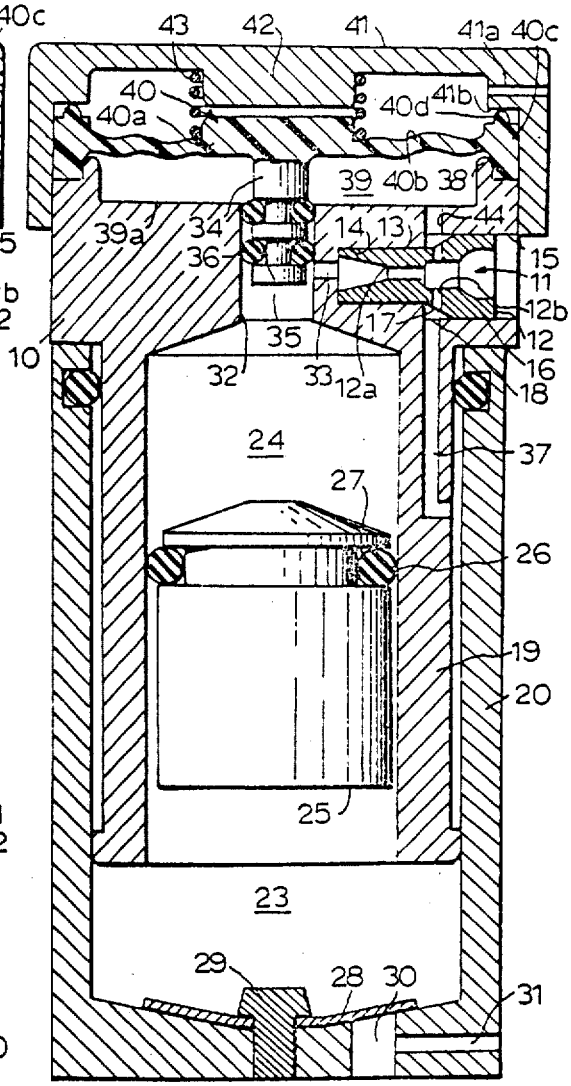
FIG. 2 is a view similar to FIG. 1 with the parts in positions at the end of a dispensing operation.

Referring first to FIGS. 1 and 2, the dispenser shown therein has a body 10 having a dispensing nozzle means 11 therein. This dispensing nozzle means is constituted by a nozzle insert 12 having a smaller diameter inner portion 13 fitted tightly in a smaller diameter recess 14 which is at the bottom of a larger diameter recess 15 opening laterally from the body 10. The nozzle insert 12 has a central Venturi passage 12a and lateral passages 12b. It further has larger diameter portion 16 which fits into the larger diameter recess 15. The inner end of the larger diameter portion 16 is beveled at 17 so as to leave a compressed air supply chamber 18 around the inner end of the larger diameter portion 16 at the inner end of the larger diameter recess 15.

A piston-cylinder means depends from the body 10 and has a fixed member 19 which in the present embodiment constitutes a piston member, and a movable member 20, which in the present embodiment constitutes a cylinder member slidable over the piston member 19. A gasket 21 fitted into a groove 22 in the inner surface of the piston 20 at the open end thereof slides along the outer surface of the piston member 19 to seal the joint between the piston 19 and the cylinder 20. Movement of the piston-cylinder member 20 toward the piston member 19 compresses air in the space 23 within the cylinder member 10.

The fixed member of the piston-cylinder means, i.e. the piston member 19, has a product containing recess 24 therein which opens toward the movable member, i.e. the cylinder member 20. A product pressurizing piston 25 is slidably positioned in the recess 24, and a gasket 26 in a groove 27 in the upper end of the piston 25 seals the piston against the inner wall of the product containing recess 24.

An air return valve is provided at the bottom of the cylinder member 20, and is constituted by a resilient flap 28 held in the closed end of the cylinder member 20 by a pin 29 and covering an air inlet 30. It is preferred that a lateral air inlet passage 31 be provided extending from the air inlet 30 laterally thereof and opening out of the side of the cylinder member 20 so that air return to the interior of the cylinder member 20 will take place even if the finger of a user should accidentally cover the outer end of the air inlet passage 30.

Opening out of the inner end of the product containing recess 24 and extending through the body 10 is a cylindrical bore 32, and extending laterally from the cylindrical bore 32 and opening into the bottom of the smaller diameter recess 14 is a lateral passage 33. The cylindrical bore 32 and the lateral passage 33 together constitute a product flow path through the body 10 from the product containing recess 24 to the nozzle means 11.

Figure 4:
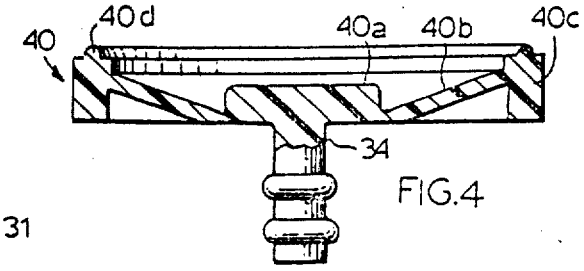
FIG. 4 is a sectional view of the improved product valve actuator.

A product control valve means is provided in the cylindrical bore 32, and is constituted by a pin 34 having at least one cylindrical groove 34 therein in which is a sealing gasket 36 which slides along the wall of the bore 32 to seal the bore 32. The pin 34 is movable in the axial direction of the bore 32 so that the gasket 36 slides between a position which is located between the product containing recess 24 and the lateral passage 33, and a position in which the gasket 36 is past the lateral passage 33 in a direction away from the product containing recess 24. Thus, movement of the pin 34 in a direction away from the product containing recess 24 opens the product flow path from the product containing recess 24 to the nozzle means 12. In the actual embodiment shown, there are two ring gaskets around pin 34 so that the pin is guided linearly along bore 32. Alternatively, the pin 34 and gaskets can be cast as a single plastic element with annular projections thereon which slide in sealing relationship along the bore 32, as shown in FIG. 4.

The body 10 further has a compressed air flow path therethrough in the form of a bore 37 which opens out of the larger diameter recess 15 from the compressed air supply chamber 18. The bore 37 extends within the wall of the piston member 19 and opens laterally thereof. It will therefore be seen that the movement of the gasket 21 past the opening of the bore 37 as the cylinder member 20 moves along the piston member 18 acts as a valve to release the compressed air from within the cylinder member 20 into the compressed flow path 37.

A product valve actuator is connected to the product control valve. The end of the body 10 remote from the piston-cylinder means has an upstanding collar 38 thereon spaced inwardly from the exterior peripheral surface of the body 10 to leave a ledge 38a. Within the space 39 defined by the collar, into which the bore 32 opens, is positioned a product valve actuator generally indicated at 40, which has an actuator element 40a which is connected to the end of the pin 34 remote from the product containing recess 24. Projecting radially outwardly and upwardly from actuator element 40a is a flexible diaphragm 40b and at the peripheral edge of diaphragm 40b is an annular flange 40c having an annular projection 40d on the upper edge thereof. The lower edge of flange 40c is seated on ledge 38a and against the outside of collar 38. A cover 41 vented at 41a is fitted tightly over the outside of body 10. A seat 41b on the inside of the cover engages the annular projection 40d to seal thereagainst and urge flange 40c firmly against ledge 38a. Depending from the center of the cover 41 is a projection 42 around which is a spring 43. The lower end of spring 43 is around actuator element 40a and urges actuator 40 downwardly, i.e. toward the closed position of product control valve. A compressed air passage 44 extends from the compressed air chamber 18 through the body 10 into the space 39, and opens into the space beneath the diaphragm 40b.

With the parts in the positions shown in FIG. 1, it will be understood that fluent product within the product containing recess 24 is at atmospheric pressure, as is any air the space 23 within the cylinder member 20. There is thus little tendency for product to leak from the apparatus, since it is under no pressure.

Force is exerted on the opposite ends of the dispenser, i.e. on the lower end of the cylinder member 20 and the upper end of the cover 41, as shown in FIG. 1. This will cause the cylinder member 20 to slide upwardly along the piston member 19, compressing air in the space 23. This air will be under increasing pressure, and will exert pressure on the product pressurizing piston 25. The spring 43, however, is sufficiently strong to hold the actuator 40 tightly against the bottom of the space 39 within the collar 38 against the force caused by pressure of the product on the bottom of pin 34, thus holding the product control valve closed, i.e. holding the pin 34 with the gasket 36 between the product containing recess 24 and the lateral passage 23.

When the gasket 21 within the cylinder member 20 passes the lateral opening of the compressed air bore 37, however, compressed air at a predetermined pressure will be released suddenly into the compressed air flow path, and will reach the compressed air supply chamber 18 around the nozzle insert 12. It will further flow through the passage 44 and act on the bottom of the diaphragm 40b. The area of the bottom of diaphragm 40b is sufficiently large so that the pressure of the air thereon raises the actuator 40 against the action of the spring 43, thus, moving the gasket 36 upwardly in the bore 32 past the lateral passage 33. Product under pressure is therefore caused to flow through the bore 32 and lateral passage 33 into the central passage 12a of the nozzle insert 12. In the meantime, compressed air is already flowing through the lateral passages 12b of the nozzle into the central passage 12a thereof. Compressed air and pressurized products are thus mixed in the central passage of the nozzle insert 12, and are dispensed laterally of the device.

As the cylinder member 20 continues to move upwardly, it continues to compress the air somewhat within the space 23 to compensate to a certain degree for the escape of air through the compressed air flow path 37. Thus, compressed air at the maximum pressure will continue to flow for a short time after the opening of the valve means for the compressed air. The cylinder member 20 eventually reaches the position shown in FIG. 2 in which it abuts the underside of the body 10, at which point no further air is compressed. The pressure of the air within the space 23 then drops rapidly until it again reaches atmospheric.

When the pressure of the air begins to drop, the pressure beneath the actuator 40 falls, and the spring 43 pushes the actuator and the pin 34 downwardly, thus closing the product control valve by moving the gasket 36 toward the product containing recess 24 past the lateral passage 33. However, compressed air will continue to flow, at a reduced pressure, beyond this time, thus cleaning from the nozzle insert 12 any product remaining therein.

When the air has been exhausted from the space 23, the cylinder member 20 is drawn downwardly, in FIG. 1, and air flows into the space 23 past the air return valve by lifting the flap 28. The device is then ready for reuse.

By changing the position of the lateral opening from the compressed air bore 37, the pressure at which the compressed air is released can be varied. The farther from the outer end of the piston member 19 is the opening, the higher the pressure at which the air will be released.

Figure 3:
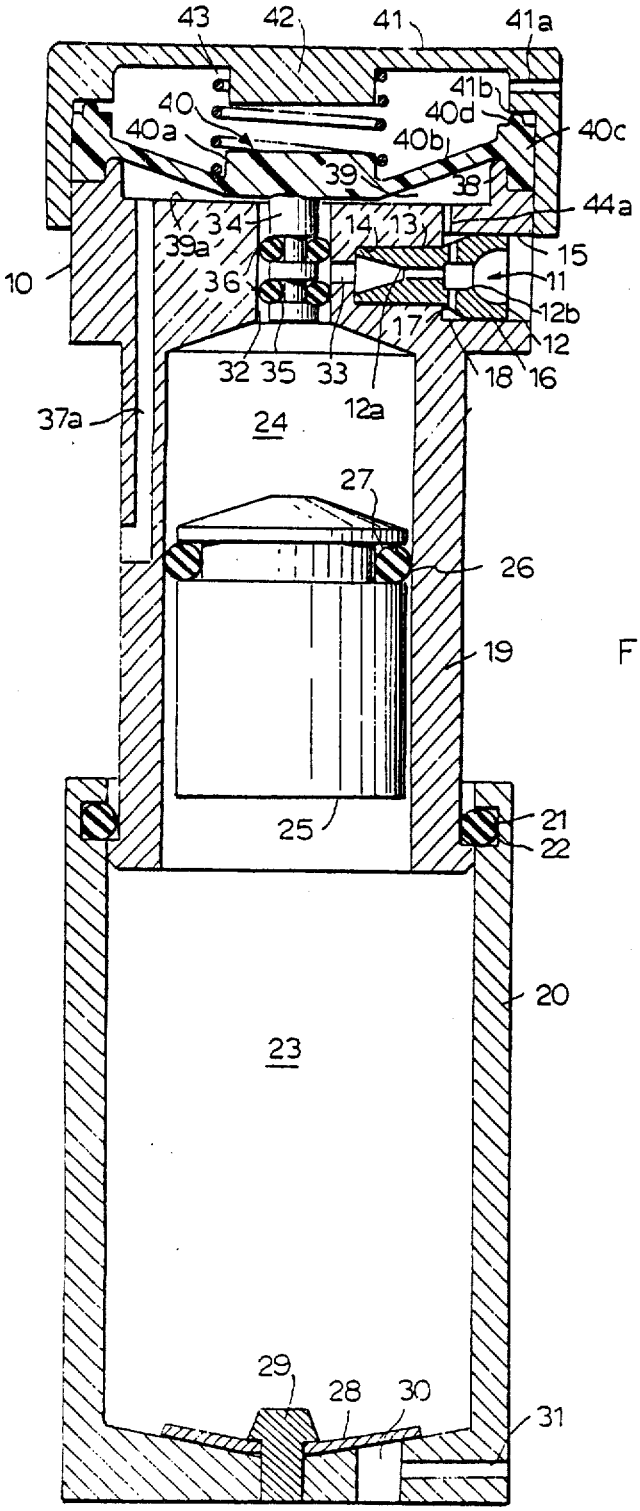
FIG. 3 is a sectional view similar to FIG. 1 of a modified embodiment of the dispensing device.

As seen in FIG. 3, the device can be modified so as to provide the compressed air flow path through a bore 37a located, for convenience in manufacturing, on the opposite side of the device from the dispensing nozzle means 11. In this case, the bore 37a extends directly into the space beneath diaphragm 40b. Further the passage 44a from the space 39 into the compressed air supply chamber 18 is positioned immediately above the larger recess portion 15, in the illustrated arrangement in a position generally diametrically opposite in the space 39 to the point at which the bore 37a opens into space 39.

With this arrangement, by simply varying the size of the passage 44a, the pressure of the compressed air at the dispensing nozzle means 11 can be controlled so as to produce the ratio of air pressure to product pressure which is best for atomizing. The smaller the bore, the lower the pressure of the air at the nozzle. In addition, the hole size times the product flow and is thus the main way of controlling the dosage dispensed by the device. This also makes it possible to use the full air pressure to actuate the product control valve in a positive manner, while using the same air to provide air at a lower pressure to the dispensing nozzle means. The upwardly angled configuration of the diaphragm insures that the actuator 40 will respond immediately to the presence of air under pressure in the space therebeneath. Moreover, the flange 40c with the projection 40d is held tightly between the cover 41 and body 10, thereby sealing the space beneath the diaphragm, yet permitting free movement of element 40a and hence of the product control valve. This is accomplished with a single element easily molded of a relatively soft plastic such as polypropylene, and easily inserted into the device during assembly. The overall device is therefore simplified and the cost reduced.

Many modifications of the construction are possible. For example, the member 19 could be extended to serve as a cylinder member, and a solid piston member could be provided to slide within it. A branch passage could be provided, in the embodiment if FIG. 3, from the bore 37a to the compressed air supply chamber 18, rather than from the groove 39a, to the chamber 18.

It will be seen that there has thus been provided a dispenser which dispenses the product by means of a charge of compressed air which is created each time the device is actuated, yet in which the compressed air also serve to exert the pressure to pressurize the product. The device is quite simple, consisting of only a dozen or so parts, some of which are readily available, such as the gaskets 21 and 26 and 36, and the spring 43, and the remainder of which are easily molded on conventional plastic molding machinery. The device can thus be made at a low cost, yet is reliable in operation, and produces a spray of very fine droplets on the order of one to ten microns in size, with a good distribution of the droplets size in the spray and a good spray pattern.

In addition, it will be seen that by the arrangement disclosed, the compressed air starts flowing into the nozzle insert 12 just a very short time ahead of the arrival of the product, i.e. during a delay in which the compressed air reaches and lifts the actuator 40. However, because the compressed air pressure soon starts to fall and falls rather gradually, the product control valve closes before the end of the flow of the compressed air, so that the compressed air at the lower pressure at the end of the actuation of the device serves to clean the nozzle insert of any product remaining therein. Moreover, because the opening of the compressed air bore 37 is below the maximum upper position of the cylinder member 20, the cylinder member continues to move and generate further compressed air, even after the initial release of the compressed air. This gives a short period of time during which the pressure of the compressed air remains at a maximum, thus promoting good product dispersal.

It is thought that the invention and its advantages will be understood from the foregoing description, and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. In a dispenser for dispensing a fine spray by means of compressed air and having a body having a dispensing nozzle means therein for mixing and dispensing a fluent product and compressed air, a piston-cylinder means depending from said body and having a fixed member in said body and a movable member movable relative to said fixed member for compressing air therebetween, said fixed member having a fluent product containing recess therein opening toward said movable member, a product pressurizing piston in said product containing recess having an end exposed toward said movable member, said body having a product flow path therethrough from said product containing recess to said nozzle means and a product control valve means in said product flow path for controlling flow of product therethrough, and said body further having a compressed air flow path therethrough to said nozzle means and compressed air valve means in said compressed air flow path which is opened near the end of the movement of said movable means for releasing compressed air at a predetermined pressure into said compressed air flow path, the improvement comprising:

a product valve actuator having an actuator element coupled to said product valve, a flexible diaphragm extending outwardly from said actuator element and sealing means on the periphery of said diaphragm fixed in sealing engagement to said body, said compressed air flow path opening beneath said diaphragm and said product valve actuator being movable in response to the pressure of the compressed air for opening said product valve, whereby when the movable member is moved toward the fixed member for compressing air, the compressed air acts on said product pressurizing piston for pressurizing the product, the compressed air at a predetermined pressure is released to said flow path, said valve actuator is moved to open said product valve.

2. A dispenser as claimed in claim 1 in which said body has a recess in which said actuator element is positioned for movement relative to said body, a cover over said recess, said diaphragm having the sealing means engaged between said body and said cover, and bias means between said cover and said actuator element acting on said actuator element for urging said element in the direction for closing the product control valve.

3. A dispenser as claimed in claim 1 in which said sealing means is a flange around the periphery of said diaphragm seated on said body around the edge of said recess, said flange having a projection on the edge thereof facing away from said body, and said cap has a seat on the inside thereof pressing against said projection when said cap is in position on said body for urging said flange against said seat and providing a seal between said projection and said seat.

4. A dispenser as claimed in claim 1 in which said diaphragm is angled away from said body as it extends outwardly from said actuator element to leave a space between said diaphragm and said body, said compressed air flow path opening into said space.

*5. In a dispenser head for dispensing a fine spray by means of compressed gas, said head having a body with a dispensing nozzle means therein for mixing and dispensing a fluent product and compressed gas, said body having a product flow path therethrough from one end thereof to said nozzle means and a product control valve means in said product flow path for controlling flow of product therethrough, said body further having a compressed gas flow path therethrough from said one end thereof to said nozzle means, the improvement comprising:*

*a product valve actuator having an actuator element coupled to said product valve, a flexible diaphragm extending outwardly from said actuator element and sealing means on the periphery of said diaphragm fixed in sealing engagement to said body, said compressed air flow path opening beneath said diaphragm and said product valve actuator being movable in response to the pressure of the compressed air for opening said product valve, whereby when compressed gas is caused to flow through said compressed gas flow path in connection with the dispensing of fluent product, said valve actuator is moved to open said product valve.*

* * * * *

UNITED STATES PATENT AND TRADEMARK OFFICE

CERTIFICATE OF CORRECTION

PATENT NO. : Reissue 29,707

DATED : July 25, 1978

INVENTOR(S) : HERBERT H. LOEFFLER

It is certified that error appears in the above–identified patent and that said Letters Patent are hereby corrected as shown below:

In the heading, after line 76, insert [73]assignee Ciba-Geigy Corporation, Ardsley, New York.

The title page should be deleted to appear as per attached title page.

Sheets 1 and 2 of the drawings should be deleted to appear as per attached sheets 1 and 2.

Signed and Sealed this

*Fourteenth* Day of *August 1979*

[SEAL]

*Attest:*

*Attesting Officer*

LUTRELLE F. PARKER

*Acting Commissioner of Patents and Trademarks*

United States Patent [19]

Loeffler

[11] E Re. 29,707

[45] Reissued Jul. 25, 1978

[54] PRODUCT PRESSURIZED AIR DISPENSER HAVING IMPROVED PRODUCT CONTROL VALVE ACTUATOR

[76] Inventor: Herbert H. Loeffler, 53 Spy Pond La., Arlington, Mass. 02174

[21] Appl. No.: 798,498

[22] Filed: May 19, 1977

Related U.S. Patent Documents

Reissue of:

[64] Patent No.: 3,979,027
Issued: Sep. 7, 1976
Appl. No.: 615,087
Filed: Sep. 19, 1975

U.S. Applications:

[63] Continuation-in-part of Ser. No. 520,946, Nov. 4, 1974, Pat. No. 3,910,465.

[51] Int. Cl.² ..... B67D 5/54
[52] U.S. Cl. ..... 222/193
[58] Field of Search ..... 222/193, 389, 383, 378; 239/357, 322, 349

[56] References Cited

U.S. PATENT DOCUMENTS

| | | | |
|---|---|---|---|
| 3,583,491 | 6/1971 | Lindeberg | 239/322 |
| 3,756,474 | 9/1973 | Riccio | 222/383 |
| 3,764,046 | 10/1973 | Riccio | 222/193 |
| 3,788,525 | 1/1974 | Thornton | 222/193 |
| 3,788,556 | 1/1974 | Riccio | 222/193 |
| 3,860,150 | 1/1975 | Maier | 222/193 |
| 3,861,564 | 1/1975 | Loeftler | 222/193 X |

*Primary Examiner*—Allen N. Knowles

[57] ABSTRACT

An improved fluent product dispenser in which the product is dispensed by means of compressed air has a dispenser body having a dispensing means therein for mixing and dispersing the fluent product and compressed air and has a piston-cylinder means thereon by which the air is compressed, and when it reaches a certain predetermined pressure, is suddenly released. The fixed member of the piston-cylinder means has a fluent product containing recess opening toward the movable member of the piston-cylinder means, and a product pressurizing piston in the product containing recess has an end exposed toward the movable member or the piston-cylinder means. A product control valve means controls the flow of product from the product containing recess to the dispensing nozzle through the body. Likewise, a compressed air valve opens to permit flow of compressed air through a compressed air path in the body to the nozzle when the compressed air reaches a certain predetermined pressure. A product valve actuator is coupled to the product valve and is mounted in a flexible diaphragm sealed at the edge thereof, and the compressed air flow path opens into the space beneath the diaphragm so as to open the product valve in a predetermined time relationship to the opening of the compressed air valve means, so that when the movable member of the piston-cylinder means is moved toward the fixed member for compressed air, the compressed air acts on the product pressurizing piston for pressurizing the product, and when the compressed air is released from the piston-cylinder means, it acts on the product valve actuator to actuate the product valve and release the product only upon release of compressed air.

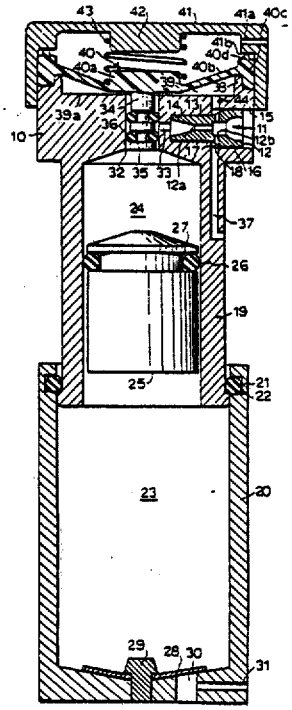

5 Claims, 4 Drawing Figures